United States Patent
Cili et al.

(10) Patent No.: US 9,369,854 B2
(45) Date of Patent: Jun. 14, 2016

(54) DEVICE AND METHOD FOR DYNAMIC CONCATENATED SHORT MESSAGING SERVICE OPTIMIZATION OF MESSAGES WITH MULTIPLE ENCODING SCHEMES

(71) Applicant: APPLE INC., Cupertino, CA (US)

(72) Inventors: Gencer Cili, Cupertino, CA (US); Hayrettin Kolukisaoglu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 72 days.

(21) Appl. No.: 14/198,184

(22) Filed: Mar. 5, 2014

(65) Prior Publication Data
US 2015/0256986 A1    Sep. 10, 2015

(51) Int. Cl.
*H04W 4/14* (2009.01)
*H04W 4/18* (2009.01)

(52) U.S. Cl.
CPC . *H04W 4/14* (2013.01); *H04W 4/18* (2013.01)

(58) Field of Classification Search
CPC .................................. H04W 4/14; H04W 4/18
See application file for complete search history.

(56) References Cited

U.S. PATENT DOCUMENTS

| 2007/0087766 A1* | 4/2007 | Hardy et al. | 455/466 |
| 2009/0075681 A1* | 3/2009 | Jager | 455/466 |
| 2011/0281594 A1* | 11/2011 | Goldberg et al. | 455/466 |

* cited by examiner

*Primary Examiner* — Nathan Mitchell
(74) *Attorney, Agent, or Firm* — Fay Kaplun & Marcin, LLP

(57) ABSTRACT

A device, method and non-transitory computer readable storage medium for receiving a text message including a plurality of characters for transmission through a network, determining, based on a number of characters and encoding schemes associated with the characters, that the text message is to be transmitted using concatenation, determining, based on the number of characters and encoding schemes for each of the characters, a minimum number of concatenated messages used to transmit the text message, encoding the minimum number of concatenated messages for transmission, wherein a first of the concatenated messages is encoded by a first encoding scheme and a second of the concatenated messages is encoded by a second encoding scheme, wherein at least one of the characters in the second concatenated message cannot be encoded by the first encoding scheme and transmitting the concatenated messages that have been respectively encoded to the receiving station.

20 Claims, 8 Drawing Sheets

Message
500

☺abcdefghijklmnopqrstuvwxyzabcdefghi
jklmnopqrstuvwxyzabcdefghijklmnopqrst
uvwxyzabcdefghijklmnopqrstuvwxyzabcde
fghijklmnopqrstuvwxyzabcdefghijklmnop
qrstuvwxyzabc

Fig. 5A

Concatenation
505

510

☺abcdefghijklmnopqrstuvwxyzabcdefghi
jklmnopqrstuvwxyzabcdefghijklmnopqrst — 515
uvwxyzabcdefghijklmnopqrstuvwxyzabcde
fghijklmnopqrstuvwxyzabcdefghijklmnop — 520
qrstuvwxyzabc

Fig. 5B

Message
600

☺abcdefghijklmnopqrstuvwxyzabcdefghi
jklmnopqrstuvwxyzabcdefghijklmnopqrst
uvwxyzabcdefghijklmnopqrstuvwxyz☺abc
defghijklmnopqrstuvwxyzabcdefghijklmn
opqrstuvwxyzabc

Fig. 6A

Concatenation
605

610

☺abcdefghijklmnopqrstuvwxyzabcdefghi — 615
jklmnopqrstuvwxyzabcdefghijklmnopqrst
uvwxyzabcdefghijklmnopqrstuvwxyz☺abc — 620
defghijklmnopqrstuvwxyzabcdefghijklmn
opqrstuvwxyzabc — 625

Fig. 6B

DEVICE AND METHOD FOR DYNAMIC CONCATENATED SHORT MESSAGING SERVICE OPTIMIZATION OF MESSAGES WITH MULTIPLE ENCODING SCHEMES

BACKGROUND INFORMATION

A first station may be configured to communicate with a second station. For example, the first station may use a transceiver to transmit and receive data from the second station through a wireless communications network. In another example, the first and second stations may be connected via a wired network (e.g., Ethernet) or a combination of wired and wireless networks. The first and second stations may use the network to communicate using a variety of different applications. For example, the first station may be a transmitting station while the second station may be a receiving station for a text message. Depending on the network being utilized, the text message may be transmitted in a respective manner. For example, when a data network is used, the text message may be transmitted in its entirety using a data encoding scheme. In another example, when a cellular network is used, the text message may be transmitted as a short messaging service (SMS) message.

When the text message is transmitted as a SMS message, the text of the message may be encoded using a variety of encoding schemes. In a first example, a 7-bit encoding scheme may be used which includes a defined alphabet including a set of characters as defined by the Global System for Mobile Communications (GSM). The 7-bit encoding scheme allows for a maximum of 160 characters to be included in one text message. In a second example, an 8-bit encoding scheme may be used which includes a defined data alphabet. The 8-bit encoding scheme allows for a maximum of 140 characters to be included in one text message. In a third example, a 16-bit encoding scheme may be used which includes a 2-byte Universal Character Set (UCS-2). The 16-bit encoding scheme allows for a maximum of 70 characters to be included in one text message.

Therefore, when a user of the transmitting station enters characters for a text message, a messaging application determines whether the text message may be transmitted as a single SMS message or as a plurality of concatenated SMS messages (which constitutes the entire text message). That is, the text message being sent via SMS may require concatenation depending on the encoding scheme used based upon the entered characters. For example, a special character of UCS-2 uses the 16-bit encoding scheme. In another example, a standard character of the GSM alphabet uses the 7-bit encoding scheme. The concatenation process for text messages transmitted using SMS uses a fixed encoding scheme. For example, when only the GSM alphabet is required, the entire text message is encoded with the 7-bit encoding scheme. In another example, when the 16-bit encoding scheme is required, this is used to encode the entire text message. However, this may result in unnecessarily generating additional concatenated messages.

BRIEF DESCRIPTION OF THE DRAWINGS

FIG. 5A shows a first exemplary text message.

FIGS. 5B-D show exemplary concatenations of the text message of FIG. 5A.

FIG. 6A shows a second exemplary text message.

FIGS. 6B-D show exemplary concatenations of the text message of FIG. 6A.

DETAILED DESCRIPTION

Figure 1:
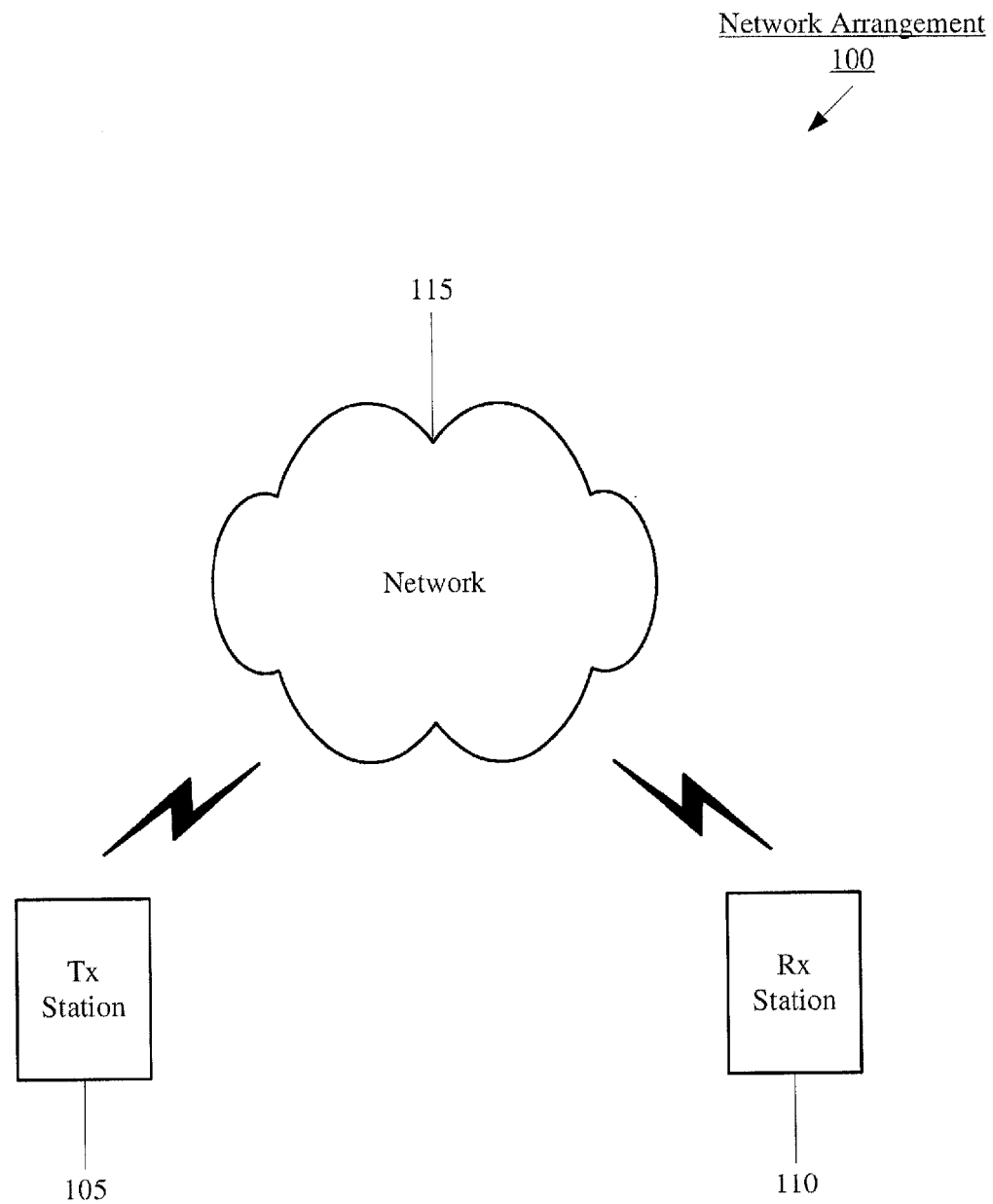
FIG. 1 shows an exemplary network arrangement for transmitting a text message.

The exemplary embodiments describe a device, method and computer readable storage medium for receiving a text message for transmission through a network to a receiving station, the text message including a plurality of characters, determining, based on a number of the plurality of characters and encoding schemes associated with the characters, that the text message is to be transmitted using concatenation, determining, based on the number of the plurality of characters and encoding schemes for each of the characters, a minimum number of concatenated messages used to transmit the text message, encoding each of the minimum number of concatenated messages for transmission, wherein a first of the concatenated messages is encoded by a first one of the encoding schemes and a second of the concatenated messages is encoded by a second one of the encoding schemes, wherein at least one of the characters in the second concatenated message cannot be encoded by the first encoding scheme and transmitting the concatenated messages that have been respectively encoded to the receiving station.

The exemplary embodiments may be further understood with reference to the following description and the related appended drawings, wherein like elements are provided with the same reference numerals. The exemplary embodiments are related to a device and method for transmitting a text message using a dynamically encoded set of concatenated Short Messaging Service (SMS) messages. Specifically, the text message is parsed to determine a minimum number of SMS messages that are required to transmit the entire text message, in which each concatenated SMS message is encoded accordingly. The text message, the SMS messages, the concatenation, a transmitting station, a receiving station, a related method, and examples will be described in further detail below.

Throughout this description, the term "text message" is used to denote a message that includes any type of characters and is not limited to only "text" characters. Examples of other types of characters include emojis, graphics, non-English characters, etc. In addition, the exemplary embodiments are described with reference to SMS, but it will be clear to those skilled in the art that the exemplary embodiments may be applied to any messaging service that uses two or more encoding schemes.

A first user of a first station may communicate with a second user of a second station in a variety of manners. In a first example, a voice application may be used to establish a live voice call in which the first and second users are capable of speaking to each other using the first and second stations, respectively. The voice call may be established through a network such as using a peer-to-peer connection. In a second example, a messaging application may be used by the first user of the first station to transmit a character-based message to the second user of the second station. Accordingly, the first user may enter a text message on the first station which is transmitted to the second station for the second user to read the text message.

The messaging application may utilize a variety of different information to determine a manner in which the text message is to be transmitted. For example, the messaging application may receive configuration information about the first and second stations. The configuration information may relate to networks that the first and second stations are associated and/or authorized to use. The configuration information may also relate to a manner in which the first and second stations process text messages. In another example, the messaging application may receive network information about the networks that the first and second stations are currently connected. The network information may relate to a manner in which the network handles the exchange of text messages. In a further example, the messaging application may utilize information related to the text message. Specifically, a length of the text message, characters included in the text message, etc. may be parsed by the messaging application to determine a manner of transmitting the text message.

In a first exemplary transmission manner, the first and second stations may be associated with a common operating platform, a common manufacturer, a common carrier, etc. That is, the configuration information may indicate that the first and second stations may be associated with a common data network as well as connected thereto. In such a scenario, there may be a specialized or proprietary pathway that is used to transmit and receive the text messages between these stations via the data network. The network information may further indicate that the text message may be transmitted through this specialized pathway as data using a data encoding scheme in which the entire text message, regardless of length and use of specialized characters, is transmitted from the first station to the second station. In a specific example, this may be an iMessage as used by devices with the iOS operating system manufactured and associated with Apple, Inc.

In a second exemplary transmission manner, the first and second stations may not have a specialized or proprietary pathway that is available for text messages to be exchanged. A standard manner of transmitting a text message through any available network may be SMS. SMS provides a text messaging service component of phone, web, and mobile communication systems. SMS uses standardized communications protocols to allow fixed line or mobile stations to exchange short text messages.

The SMS—Point to Point (SMS-PP) is maintained in 3GPP that defines the SMS—Cell Broadcast (SMS-CB) allowing text messages (e.g., advertising, public information, etc.) to be broadcast to users in a specified geographical area. The text messages are transmitted from the transmitting station to a SMS center (SMSC) that provides a "store and forward" mechanism in which the text message that is received is stored so that the SMSC later attempts to send the text messages to the intended recipients (e.g., receiving station). Text message delivery uses a "best effort" delivery in which there are no guarantees that a text message actually is delivered to its recipient.

The transmission of text messages as SMS between the SMSC and the station is done whenever using the Mobile Application Part (MAP) of the SS7 protocol. The text messages are sent with the MAP ForwardSM operations whose payload length is limited by the constraints of the signaling protocol to precisely 140 octets (140 octets=140*8 bits=1120 bits). With this limitation, SMS messages may be encoded using a variety of alphabets: the default GSM 7-bit alphabet, the 8-bit data alphabet, and the 16-bit UCS-2 alphabet. Depending on which alphabet the station is configured as well as the characters included in the text message, this leads to the maximum individual short message sizes of 160 7-bit characters, 140 8-bit characters, or 70 16-bit characters. The GSM 7-bit alphabet support is mandatory for GSM handsets and network elements, but characters in other languages (e.g., Arabic, Chinese, Korean, Japanese, or Cyrillic alphabet languages (e.g., Russian, Serbian, Bulgarian, etc.)) must be encoded using the 16-bit UCS-2 character encoding (i.e., Unicode).

In view of the maximum number of characters allowed to be included in the SMS (based upon the encoding scheme), larger content may be sent using multiple SMS messages that constitute the entire text message. When no mechanism is configured for large text messages, the user may be prevented from entering any further characters into the text message. A mechanism that is used to overcome this drawback is concatenated SMS. For example, with the maximum character limitation, a text message may be divided into three SMS messages that are concatenated. The first message may be a first set of characters that is delivered first; the second message may be a second set of characters immediately following the first set of characters that is delivered second; and the third message may be a third set of characters immediately following the second set of characters that is delivered third.

Each concatenated SMS message may start with a User Data Header (UDH) containing segmentation information. Since UDH is part of the payload, the number of available characters per segment may be lower (e.g., 153 for 7-bit encoding, 134 for 8-bit encoding, and 67 for 16-bit encoding). The receiving station may reassemble the message and present it to the user as one long message or present it as individual messages. While the standard theoretically permits up to 255 segments, six to eight segment concatenated SMS messages are often the practical maximum. The concatenation process provides a seamless manner in which a large text message that exceeds the maximum number of allowed characters within a SMS message to be divided into a plurality of SMS messages and transmitted from the transmitting station to the receiving station without any intervention required from the users of both stations.

In a first example of transmitting concatenated SMS messages, the entire text message may use only the 7-bit encoding scheme. Thus, the text message may be split into 153 7-bit character parts (134 octets) with each part transmitted with a User Data Header (UDH) appended onto the beginning of the payload. The UDH may be used for various purposes and its contents and size varies accordingly. However, a UDH for concatenated SMS messages may include predetermined fields. Field 1 (1 octet) may indicate a length of the UDH (e.g., 05). Field 2 (1 octet) may indicate an Information Element Identifier (e.g., equal to 00 (Concatenated SMS messages, 8-bit reference number)). Field 3 (1 octet) may indicate a length of the header excluding the first two fields (e.g., equal to 03). Field 4 (1 octet) may indicate a concatenated SMS reference number which must be the same for all the parts in the concatenated SMS messages of a text message (e.g., 00-FF). Field 5 (1 octet) may indicate a total number of parts. The value remains constant for every concatenated SMS message that makes up the entire text message. If the value is zero, then the receiving station may ignore the whole information element. Field 6 (1 octet) may indicate the sequence in which the particular concatenated SMS message is associated. The value may start at 1 and increment for every concatenated SMS message that makes up the text message. If the value is zero or greater than the value in Field 5, then the receiving station may ignore the whole information element.

In a second example of transmitting concatenated SMS messages, the entire text message may use only the 16-bit encoding scheme. The 16-bit encoding scheme may enable a reduction in the probability that two different concatenated SMS messages are sent with identical reference numbers to a receiving station. In this case, the UDH may include modified fields. Field 1 (1 octet) may indicate a length of the UDH (e.g., 06). Field 2 (1 octet) may indicate an Information Element Identifier (e.g., equal to 08 (Concatenated SMS messages, 16-bit reference number)). Field 3 (1 octet) may indicate a length of the header excluding the first two fields (e.g., equal to 04). Field 4 (2 octets) may indicate a concatenated SMS reference number which must be the same for all the parts in the concatenated SMS messages of a text message (e.g., 0000-FFFF). Field 5 (1 octet) may indicate a total number of parts. The value remains constant for every concatenated SMS message which makes up the text message. If the value is zero, then the receiving station may ignore the whole information element. Field 6 (1 octet) may the sequence in which the particular concatenated SMS message is associated. The value may start at 1 and increment for every concatenated SMS message which makes up the entire text message. If the value is zero or greater than the value in Field 5, then the receiving station may ignore the whole information element.

Those skilled in the art will understand that the use of the headers and its occupation of bits in the payload for concatenated SMS messages does not substantially affect the manner in which the exemplary embodiments are utilized in the dynamic encoding of the concatenated SMS messages (as will be described in further detail below). For example, if the 7-bit encoding scheme is used, the limit may be 160 characters. Although described as including 160 characters without consideration for a header, the limit may also be considered to be 153 characters when the header is included. However, the exemplary embodiments below do not include the space used by the header. Initially, the headers may be incorporated in the concatenated SMS messages without deviating from the dynamic manner of encoding provided herein. Furthermore, as will be explained in further detail below, the header information may be separate from the concatenated SMS messages to further maximize the number of allowable characters therein.

Long text messages are often billed as equivalent to multiple SMS messages. That is, each concatenated SMS message of the text message is used for billing purposes. Due to a common encoding scheme being used for each concatenated SMS message of the text message in standard SMS systems, this may result in additional concatenated SMS messages from being generated for the text message. This may impact both the user and the network. With regard to the user, when a limited text messaging plan is subscribed to be the user, the additional concatenated SMS messages may deduct from this limit unnecessarily. With regard to the network, extra signaling results from the additional concatenated SMS messages being required to be transmitted therethrough, thereby increasing a network load.

The exemplary embodiments provide a dynamic manner of encoding individual concatenated SMS messages that make up a long text message. As discussed above, the potentially extra concatenated SMS messages may have drawbacks for both the users and the network. When the transmitting station reduces a total number of concatenated SMS messages for the long text message such that a minimum number is only used, these drawbacks may also be minimized. In contrast to a fixed encoding scheme being used for each individual concatenated SMS message, the exemplary embodiments may parse the long text message to determine the minimum number of concatenated SMS messages that are required and encode each concatenated SMS message accordingly for transmission.

FIG. 1 shows an exemplary network arrangement 100 for a transmitting station 105 to transmit a long text message to a receiving station 110 through a network 115. Specifically, the transmitting station 105 may determine a manner of transmitting the long text message to the receiving station 110 based upon a variety of available information relating to the stations 105, 110 and the network 115. The network 115 may represent any network that enables the long text message to be exchanged between the transmitting station 105 and the receiving station 110. For example, as discussed above, the network 115 may be a data network that provides a specialized pathway for the long text message to be encoded using a data encoding scheme and transmitted in its entirety. In another example, the network 115 may represent any cellular network in which the long text message may be transmitted using SMS and utilize concatenated SMS messages if required.

The transmitting station 105 and the receiving station 110 may represent any electronic device that are configured with a messaging application. It should be noted that the transmitting station 105 and the receiving station 110 may be assumed to have the required hardware and software configuration to utilize the messaging application. For example, the hardware, the software, or both may be incorporated therein or may be coupled in a modular manner. As will be described in further detail below, the transmitting station 105 may also be configured with a concatenation application. The receiving station 110 may optionally include the concatenation application.

Figure 2:
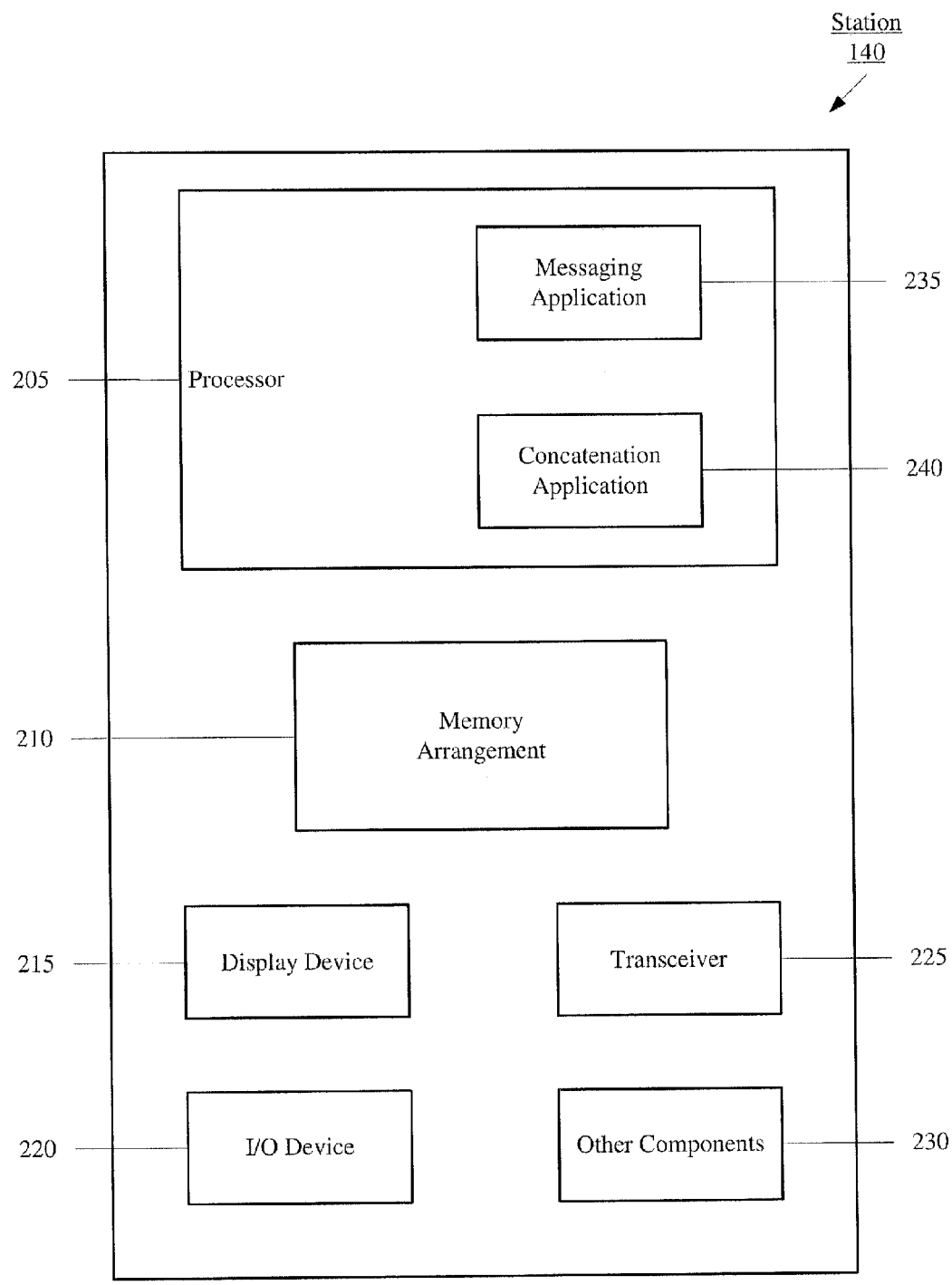
FIG. 2 shows an exemplary station configured to transmit a text message.

FIG. 2 shows an exemplary station 200 configured to transmit a text message. Specifically, the station 200 may represent an electronic device such as the transmitting station 105 and the receiving station 110. The station 200 may be any electronic component configured to transmit the text message such as a portable device (e.g., a cellular phone, a smartphone, a tablet, a phablet, a laptop, etc.) or a stationary device (e.g., a desktop computer, an IP phone, etc.). More particularly, when the station 200 is a portable device, the transmitting station 105 may be a mobile originating (MO) station while the receiving station 110 may be a mobile terminating (MT) station. The station 200 may include a processor 205, a memory arrangement 210, a display device 215, an input/output (I/O) device 220, a transceiver 225, and other components 230.

The processor 205 may be configured to execute a plurality of applications of the station 200. For example, the applications may include a web browser when connected to the network 115 via the transceiver 225. That is, the web browser may represent a data-related application.

In another example, the applications may include a messaging application 235. The messaging application 235 may enable the text message from being received from the user and transmitted to the destination. The messaging application 235 may be executed by the processor 205 to show the user interface in which the user may select a target user (and corresponding destination device) or group of users to transmit a text message. The user interface may also include a display of previously exchanged text messages with the user(s). The user interface provides an input field in which the user may enter the characters of the text message. The messaging application 235 may further be configured to determine a variety of parameters related to transmitting the text message. For example, the messaging application 235 may receive the configuration information of the transmitting station 105 and the receiving station 110 as well as the network information.

The messaging application 235 may determine a manner of transmitting the text message. As discussed above, the messaging application 235 may transmit the text message using a data encoding scheme when the specialized pathway is used when the network 115 is the data network or may transmit the text message using the 7-bit, the 8-bit, and/or the 16-bit encoding scheme as defined for SMS messages. Thus, the messaging application 235 may use the configuration and network information to make this determination. The messaging application 235 may also determine when concatenation may be required. For example, when the messaging application 235 determines that the text message may be transmitted in a single SMS message, the messaging application 235 may encode the text message using the appropriate encoding scheme for transmission thereof. In another example and as will be described in further detail below, the messaging application 235 may provide the configuration and network information as well as the text message itself to a concatenation application 240 to subsequently receive an indication as to a manner of concatenating the text message as well as the encoding scheme to be used for each concatenated SMS message. Upon receiving this indication, the messaging application 235 may apply the indicated encoding scheme to the text message for transmission thereof.

In a further example and according to the exemplary embodiments, the messaging application 234 may include the functionality described herein for the concatenation application 240. The concatenation application 240 may receive the information and the text message from the messaging application 235. Since the concatenation application 240 has received the information and text message (and is being used), the text message may be sufficiently long that concatenation is needed. For example, the text message may be more than 160 characters. When this condition applies, the messaging application 235 may automatically determine that concatenation is required as this exceeds the highest maximum amount as defined by the 7-bit encoding scheme for SMS. In another example, the messaging application 235 may determine that the text message includes at least one special character that is not defined by the 7-bit and 8-bit encoding schemes. Therefore, the 16-bit encoding scheme may be required. However, the text message may be more than 70 characters which indicates that concatenation is most likely also required.

It should be noted that the messaging application 235 being configured to determine whether concatenation is required is only exemplary. The concatenation application 240 may also be configured to perform this functionality. Accordingly, the text message may be forwarded from the messaging application 235 to the concatenation application 240. The concatenation application 240 may determine whether concatenation is required or whether the text message may be transmitted using the data encoding scheme or as a single SMS message. This may be included in the indication provided to the messaging application 235 from the concatenation application 240.

According to the exemplary embodiments, the concatenation application 240 may generate a variety of different separations of the long text message to also determine a minimum number of concatenated SMS messages to be used while still maintaining the bounds of the encoding schemes for the characters included in the text message. Because the concatenation application 240 is configured to dynamically determine the encoding scheme to be used for each concatenated SMS message, the text message may be separated into a plurality of portions where a portion uses one encoding scheme but this encoding scheme is not necessarily used by each portion. However, as will be described below, it should be noted that there may be situations where a common encoding scheme may be used for each portion.

It should be noted that the messaging application 235 and the concatenation application 240 being an application (e.g., a program) executed by the processor 205 is only exemplary. The messaging applications 235 and the concatenation application 240 may also be represented as a separate incorporated component of the station 200 or may be a modular component coupled to the station 200.

The memory arrangement 210 may be a hardware component configured to store data related to operations performed by the station 200. For example, the memory arrangement 210 may store information related to transmitting the text message such as the configurations of the station 200, the configurations of the receiving station, the network configurations, etc. In another example, the memory arrangement 210 may store a user database for the messaging application 235 as well as corresponding text messages that have already been exchanged with the respective user(s). The display device 215 may be a hardware component configured to show data to a user while I/O device 220 may be a hardware component configured to receive inputs from the user and output corresponding data. For example, the display device 215 may provide the user interface for the user to view the text message to be transmitted while the I/O device 220 may provide the user interface for the user to enter the characters of the text message. The other components 230 may include a portable power supply (e.g., battery), a fixed power supply (e.g., AC or DC), a data acquisition device, ports to electrically connect the station 200 to other electronic devices, an audio I/O device, etc.

According to the exemplary embodiments, the text message may be received from the user by the messaging application 235. When the messaging application 235 determines that the text message may be transmitted with a data encoding scheme or as a single SMS message, the messaging application 235 may apply the appropriate encoding to transmit the text message to the destination. However, when the messaging application 235 determines that the text message is long enough based upon the various encoding schemes, the concatenation application 240 may be used to determine the manner in which the text message is to be separated and to determine the encoding scheme to be applied to each portion.

A standard messaging application that does not utilize a concatenation of the exemplary embodiments may determine the one encoding scheme to be used throughout. In a specific example, a text message may include 160 characters with the first character being a special character using Unicode (i.e., 16-bit) while the remaining 159 characters are 7-bit characters. It should be noted that the special character may be any character that is not included in the 7-bit or 8-bit characters such as emojis, graphics, non-English characters, etc. The standard messaging application may parse the characters to determine the inclusion of the one special character. Since this special character is included, the entire text message may have the 16-bit encoding scheme applied. Therefore, each concatenated SMS message may include, at most, 70 characters (not considering a header for each concatenated SMS message). Thus, a first concatenated SMS message may include the one special Unicode character and 69 of the 7-bit characters; a second concatenated SMS message may include the ensuing 70 7-bit characters; and a third concatenated SMS message may include the remaining 20 7-bit characters. Accordingly, the concatenation produces three concatenated SMS messages.

Those skilled in the art will understand that the second and third concatenated SMS messages do not include any Unicode characters. However, since the first concatenated SMS message includes a Unicode character, the second and third concatenated SMS messages are restricted to having only 70 maximum characters since the 16-bit encoding scheme is still used by the standard messaging application. The exemplary embodiments are configured for a baseband control software component (e.g., the concatenation application 240) to indicate that the text message may be concatenated in such a manner that only two concatenated SMS messages may be used to still transmit the entire text message. Specifically, the first concatenated SMS message may be encoded using the 16-bit encoding scheme and include the one Unicode character and 69 7-bit characters while the second concatenated SMS message may be encoded using the 7-bit encoding scheme and include the remaining 90 7-bit characters.

Accordingly, the exemplary embodiments provide the baseband control software component (i.e., concatenation application 240 that controls the baseband protocol stack with an intelligence to parse the content of the text message stream from the messaging application to determine which characters require what kind of encoding scheme. While creating the concatenated SMS messages for the text message, the concatenation application 240 may determine the lowest possible encoding scheme that may be used for the specific concatenation. In the example above, the first concatenated SMS message includes the Unicode character such that the lowest possible encoding scheme is the 16-bit encoding scheme. However, the second concatenated SMS message includes only 7-bit characters such that the lowest possible encoding scheme is the 7-bit encoding scheme. In this manner, the maximum number of characters may be available to be included within a given concatenated SMS message.

As discussed above, the concatenated SMS messages may not include the headers described above. Specifically, the SMS control protocol (CP)-data that corresponds to the different sequence numbers may be encoded independently of the concatenated parts. Therefore, each concatenated SMS message may include the maximum number of characters therein (e.g., 70 for 16-bit encoding, 140 for 8-bit encoding, and 160 for 7-bit encoding). However, the exemplary embodiments may also be modified such that each concatenated SMS message also includes the UDH and the corresponding sequence information.

The exemplary embodiments to dynamically apply respective encoding schemes to each concatenated SMS message may ultimately reduce an amount of concatenated SMS messages used in a long text message having characters belonging to various character/encoding sets. For example, a user typing English characters (i.e., 7-bit characters) combined with emojis symbols (e.g., smiley face graphic) may benefit from the dynamic encoding scheme. In another example, a user typing a long message with both characters from a Latin alphabet and an Arabic alphabet may benefit from the dynamic encoding scheme. Although a long text message that includes characters from only a single encoding set may result in the same number of concatenated SMS messages, when characters use different encoding sets, the exemplary embodiments are configured to minimize the concatenated SMS messages to be used.

Figure 3:
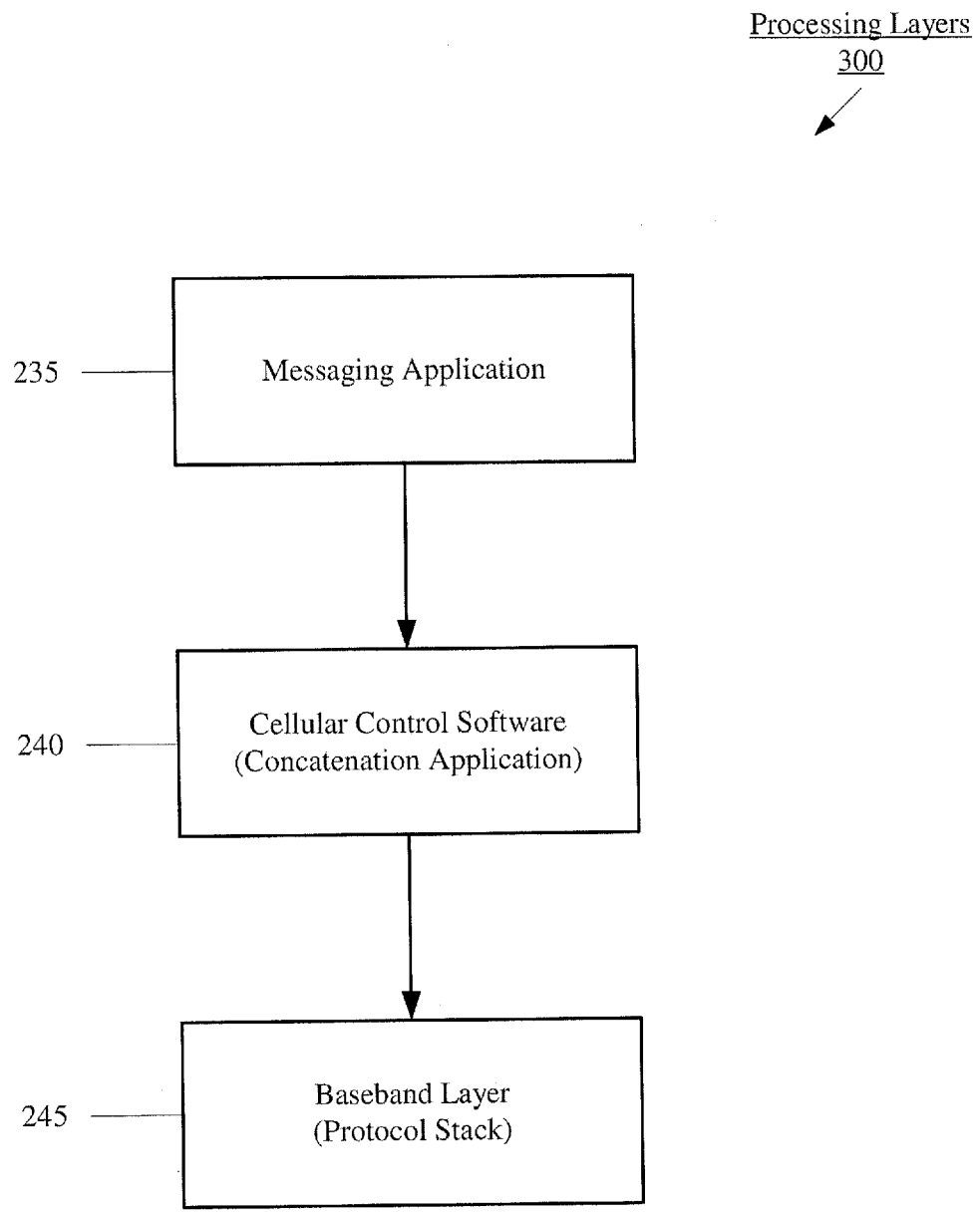
FIG. 3 shows an exemplary set of processing layers to transmit a text message.

FIG. 3 shows an exemplary set of processing layers 300 to transmit a text message. The processing layers 300 may include the messaging application 235, the cellular control software (e.g., the concatenation application 240), and a baseband layer 245 including a protocol stack. As described above, the messaging application 235 and/or the concatenation application 240 may determine whether a concatenation is to be used. The description below relates the concatenation application 240 performing this determination.

The exemplary embodiments provide for instructions to the baseband layer 245 to be sent accordingly for concatenated SMS submissions. Dynamic encoding schemes for different concatenated SMS messages may be indicated to the baseband stack so that the over-the-air submissions may have optimal encoding schemes for different sequence numbers of the same message. The concatenation application 240 may start parsing the received message strings from the messaging application 235. The concatenation application 235 may already be configured with the possible encoding schemes that define the corresponding bits/characters and maximum characters/SMS ratios. Starting from the scheme that has the lowest bits/character ratio, concatenated SMS message may be checked to find the lowest possible encoding scheme for each sequence number. The exemplary embodiments may identity a largest chunk of the text message to be included into a single concatenated SMS message with continuous usage of a common encoding scheme to attempt to maximize the sequence of characters that may be sent with a low encoding scheme.

Accordingly, the messaging application 235 may receive user inputs for various characters to be included in a single text message. The characters may be sent down to the concatenation application 240 on the processor 205 (more specifically an application processor of the station 200). The concatenation application 240 may parse through all the characters to decide if there is a need for concatenation. While deciding on the need for concatenation, the concatenation application 240 may use the lowest possible encoding scheme for a certain concatenation sequence number (e.g., concatenated SMS message). The CP-data with different sequence numbers may have unique and independent encoding schemes. Each concatenated SMS message may be tagged with sequence numbers and respective encoding schemes. Thus, the concatenation information from the concatenation application 240 may be forwarded to the baseband layer 245 which may operate on the processor 205 (more specifically a modem processor of the station 200). For example, the concatenation information may indicate that the text message is to include three concatenated SMS messages in which the first sequence has a first encoding, the second sequence has a second encoding, and the third sequence has a third encoding. The baseband layer 245 may receive the concatenation information from the concatenation application 240 and use the corresponding encoding schemes for each concatenated SMS message. The text message may thereby be transmitted as a combination of the concatenated SMS messages.

Figure 4:
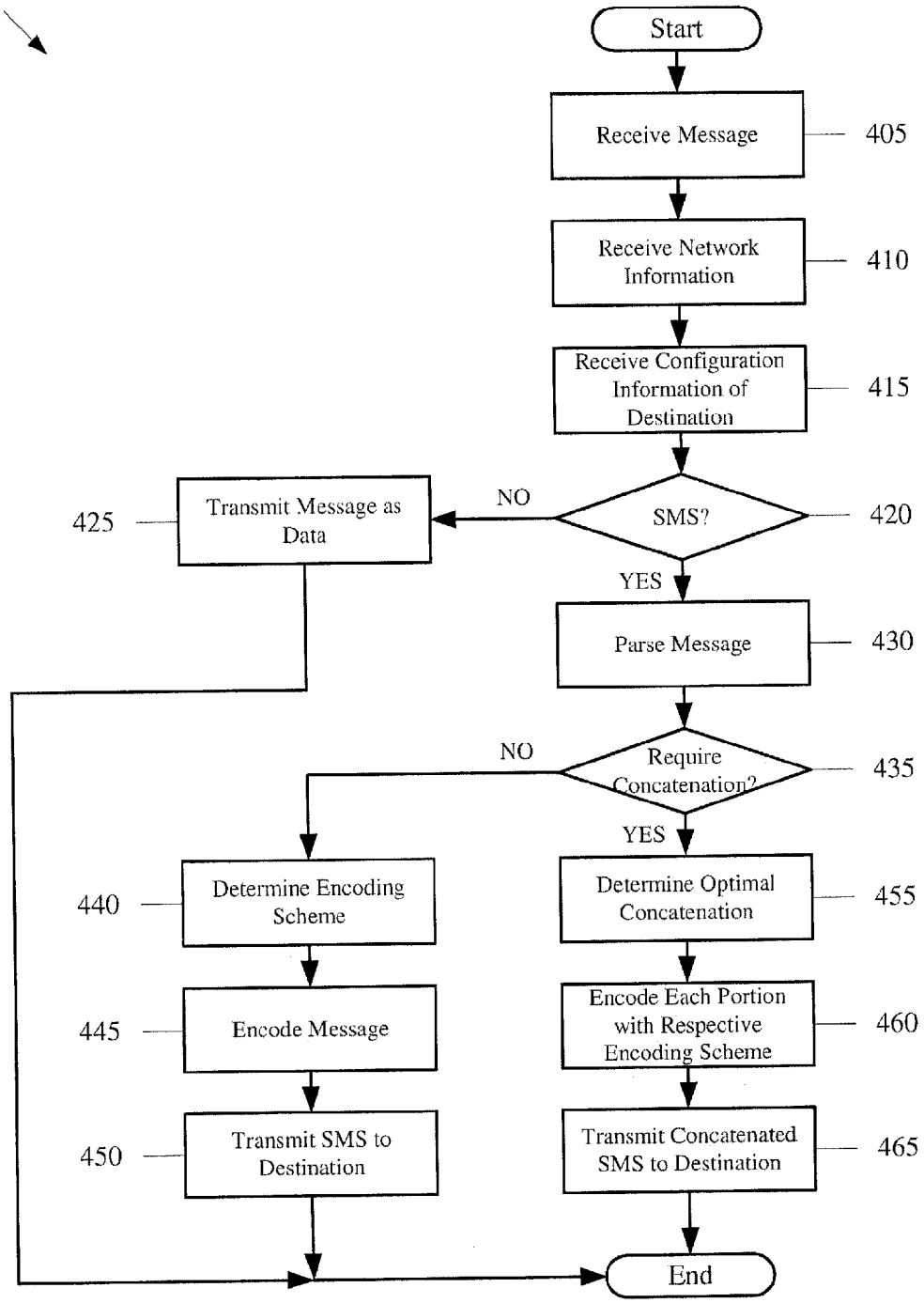
FIG. 4 shows an exemplary method of transmitting a text message.

FIG. 4 shows an exemplary method 400 of transmitting a text message. The method 400 relates to transmitting the text message using a data encoding scheme or a SMS encoding scheme. The method 400 also relates to whether the text message is to be sent as a SMS that requires concatenation. The method 400 will be described with regard to the network arrangement 100 of FIG. 1 and the station 200 of FIG. 2. The method 400 will also be described with regard to the messaging application 235 receiving the characters for the text message while the concatenation application 240 provides the further functionalities. Furthermore, the method 400 relates to the operations performed by the transmitting station 105.

In step 405, the messaging application 235 receives the text message from the user via the I/O device 220. As described above, the messaging application 235 may provide a user interface in which the characters of the text message may be input. The characters that are entered may be part of the GSM 7-bit alphabet (using 7-bit encoding), a 8-bit data alphabet (using 8-bit encoding), or a specialized dictionary of characters such as Unicode characters, emoji, non-English letters, etc. (using 16-bit encoding).

In step 410, the transmitting station 105 receives the network information of the network 115. In step 415, the transmitting station 105 receives the configuration information of the destination device (i.e., the receiving station 110). Steps 410 and 415 may be performed sequentially as shown, in the reverse order, or concurrently. Furthermore, the messaging application 235 and/or the concatenation application 240 may receive the network information and the configuration information. Although not shown, the transmitting station 105 may also access its own configuration information. Thus, the transmitting of the text message may be based upon the configuration information of the transmitting station 105, the configuration information of the receiving station 110, and the network information of the network 115.

It should be noted that the network information and the configuration information of the receiving station 110 may be received in a variety of manners. With regard to the network information, upon associating and/or connecting to the network 115, the transmitting station 105 may have receive the network information. The transmitting station 105 may also transmit a request to the network 115 to receive the network information. With regard to the configuration information of the receiving station 110, the transmitting station 105 may transmit a request to the receiving station 110 for its configuration information. The transmitting station 105 may also have access to a database available on the network 115 that includes the configuration information of associated devices such as the receiving station 110. The transmitting station 105 may also utilize multimedia messaging service (MMS) messages to receive the configuration information of the receiving station 110.

In step 420, the concatenation application 240 determines whether the text message is to be transmitted as a SMS. As described above, the text message may be transmitted using a specialized pathway when the network 115 is a data network and when the configuration information of the transmitting station 105 and the receiving station 110 indicate this functionality. Thus, if the text message is to be transmitted in this manner, the method 400 continues to step 425. In step 425, the text message is encoded using the data encoding scheme and transmitted accordingly. Specifically, the entire text message is encoded in this manner and also transmitted in its entirety to the receiving station 110.

Returning to step 420, if the text message is to be transmitted as a SMS, the method 400 continues to step 430. In step 430, the concatenation application 240 parses the text message received from the messaging application 235. The concatenation application 240 may thus determine the various encoding schemes that may be required and also determine whether the text message may be transmitted as a single SMS message. Therefore, in step 435, the concatenation application 240 performs this determination of whether concatenation is required.

If concatenation is not required, the method 400 continues to step 440. In step 440, the concatenation application 240 provides instructions to the baseband layer that the entire text message is to be encoded using the same encoding scheme. For example, if the text message is less than 70 characters and includes a Unicode character, the entire message is to be encoded using the 16-bit encoding scheme. In another example, if the text message is less than 160 characters and includes only 7-bit characters, the entire message is to be encoded using the 7-bit encoding scheme. Thus, in step 445, the text message is encoded as indicated in the instructions. IN step 450, the baseband layer 240 transmits the single SMS to the receiving station 110.

Returning to step 435, if the concatenation application 240 determines that the text message is long and requires concatenation, the method 400 continues to step 455. For example, if the text message exceeds 160 characters, regardless of the encoding schemes that are to be used, the text message uses concatenation. In another example, if the text message exceeds 70 characters and includes at least one Unicode character, the text message uses concatenation.

In step 455, the concatenation application 240 determines an optimal concatenation to be used in which the text message is separated into concatenated SMS messages. The concatenated SMS messages are also assigned an appropriate encoding scheme depending on the characters that are included therein. For example, the concatenation application 240 may initially attempt to determine whether the lowest encoding scheme (e.g., 7-bit encoding scheme) may be used. When the characters in the concatenated SMS message includes characters outside the set of the lowest encoding scheme, the next highest encoding scheme (e.g., 8-bit encoding scheme) may be attempted. If this next highest still cannot be used, the highest 16-bit encoding scheme may be used.

In step 460, the concatenation application 240 transmits instructions to the baseband layer 245 that indicates how the text message is to be separated into the concatenated SMS messages, the encoding scheme to be used with each concatenated SMS message, and the sequence in which the concatenated SMS messages are to be organized. Thus, in step 465, the baseband layer 245 transmits the concatenated SMS messages to the receiving station 110.

With regard to the operations performed by the receiving station 110, the text message may be received in the manners described above in the method 400. The receiving station 110 may include the messaging application 235 and optionally the concatenation application 240.

In the first example, the transmitting station 105 may perform step 425 to transmit the text message as data. The text message is transmitting in this manner when the transmitting station 105 is aware that the receiving station 110 is capable of this functionality. Thus, the receiving station 110 may receive the entire text message using its messaging application 235 having the data encoding scheme applied. The entire text message may also be shown as a single unit (e.g., within a single bubble in the user interface of the messaging application 235).

In the second example, the transmitting station 105 may perform steps 440-450 to transmit the text message as a single SMS message. Thus, the messaging application 235 of the receiving station 110 may receive the single SMS message to be decoded using a reverse operation to encode using the respective encoding scheme. The entire text message may be shown as a single unit as only a single SMS message was received.

In the third example, the transmitting station 105 may perform steps 455-465 to transmit the text message as a plurality of concatenated SMS messages. Thus, the messaging application 235 of the receiving station 110 may receive these concatenated SMS messages to be decoded using a reverse operation to encode using the respective encoding scheme. In this example, each concatenated SMS message may have been encoded with different encoding schemes. Thus, the messaging application 235 may determine the encoding schemes used to properly decode them. Furthermore, the receiving station 110 may include the concatenation application 240 that may be configured to perform an assembly functionality for the received concatenated SMS messages. In this manner, the concatenated SMS messages may be combined into a single text message for display to the user of the receiving station 110. However, it should be noted that each concatenated SMS message may also be shown separately on the user interface of the messaging application 235.

The following examples describe use cases in which a concatenation process is used by the exemplary embodiments to dynamically encode each concatenated SMS message so that the number of concatenated SMS messages used for a text message is minimized. Specifically, FIGS. 5A-D relate to a first example while FIGS. 6A-D relate to a second example.

Figure 5C:
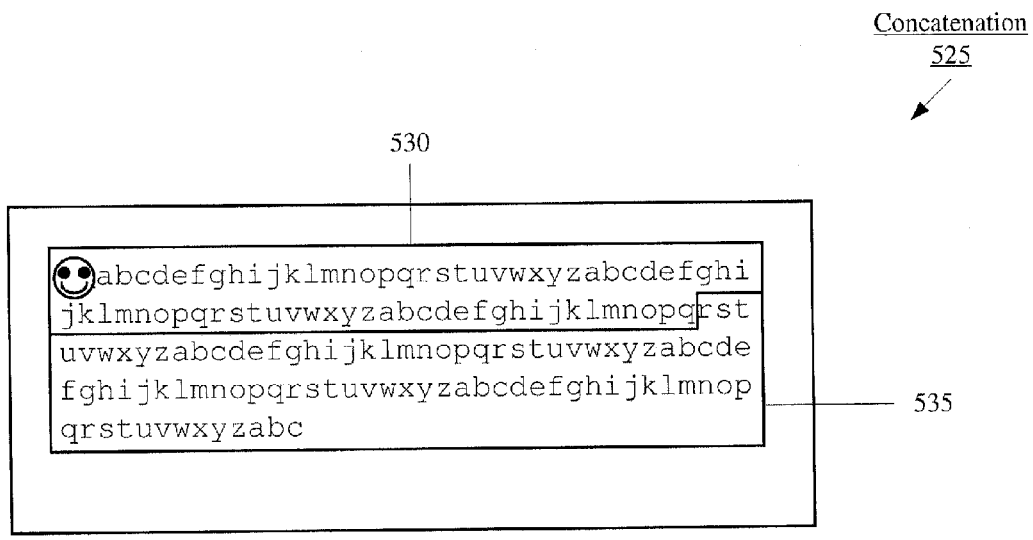
Figure 5D:
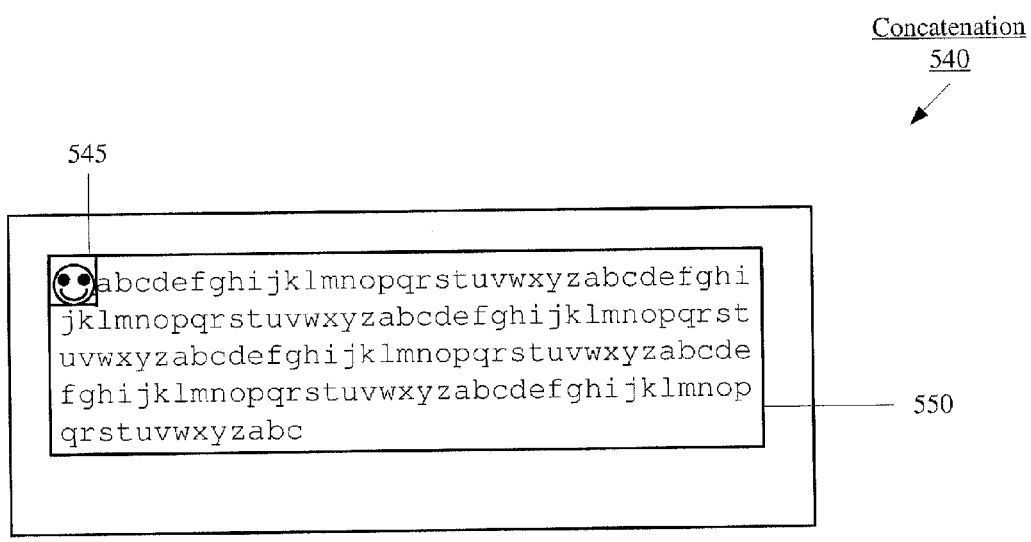

FIG. 5A shows a first exemplary text message 500. The text message 500 includes 160 total characters in which the first character is a Unicode character while the remaining 159 characters are 7-bit characters. This may be substantially similar to the example described above. FIGS. 5B-D show exemplary concatenations of the text message of FIG. 5A.

FIG. 5B shows a concatenation 505 in which the text message 500 is separated into three concatenated SMS messages 510, 515, 520. The concatenation 505 illustrates that the concatenation application 240 may also attempt to use standard manners. For example, the detection of the Unicode character may cause an attempt in which the 16-bit encoding scheme is used throughout. Thus, the first concatenated SMS message 510 includes the one Unicode character and 69 7-bit characters, all encoded with the 16-bit encoding scheme; the second concatenated SMS message 515 includes 70 7-bit characters, all encoded with the 16-bit encoding scheme; and the third concatenated SMS message 520 includes 20 7-bit characters, all encoded with the 16-bit encoding scheme.

However, FIG. 5C shows a concatenation 525 in which the text message 500 is separated into two concatenated SMS messages 530, 535. According to the exemplary embodiments, the concatenation application 240 may determine that the first concatenated SMS message 530 may be encoded using the 16-bit encoding scheme due to the Unicode character. However, the text message may include all remaining 90 characters into a single concatenated SMS message 535 which may be encoded using the 7-bit encoding scheme. Thus, the result is the use of only two concatenated SMS messages from the concatenation 525 as opposed to the three concatenated SMS messages from the concatenation 505.

FIG. 5D shows another concatenation 540 in which the text message 500 is separated into two concatenated SMS messages 545, 550. The concatenation application 240 may determine that since the entire length of the text message is 160 characters with only the very first character being a Unicode character, the text message may be separated such that the Unicode character is the only one in the concatenated SMS message 545 while the remaining 159 characters are included in the concatenated SMS message 550. That is, the first concatenated SMS message 545 is encoded using the 16-bit encoding scheme while the second concatenated SMS message 550 is encoded using the 7-bit encoding scheme. The concatenation application 240 may thus provide instructions for the text message to be transmitted using the concatenation 540 which also only uses two concatenated SMS messages. It should be noted that the concatenation 540 may be used for further reasons such as less characters being encoded with the higher 16-bit encoding scheme while still using a minimum number of concatenated SMS messages.

FIG. 6A shows a second exemplary text message 600. The text message 600 includes 161 total characters in which the first character is a Unicode character, the second to one hundredth and fifth characters are 7-bit characters, the one hundredth and sixth character is a Unicode character, and the remaining characters are 7-bit characters.

FIG. 6B shows a first concatenation 605 in which the text message 600 is separated into four concatenated SMS messages 610, 615, 620, 625. The concatenation 605 may be generated from the above noted reason of limiting the number of characters encoded with the highest encoding scheme. Thus, the Unicode characters are each encoded with the 16-bit encoding scheme and also separated from the 7-bit characters. That is, the first concatenated SMS message 610 includes the Unicode character encoded with the 16-bit encoding scheme; the second concatenated SMS message 615 includes 104 7-bit characters, all encoded with the 7-bit encoding scheme; the third concatenated SMS message 620 includes the Unicode character encoded with the 16-bit encoding scheme; and the fourth concatenated SMS message 625 includes the remaining 55 7-bit characters, all encoded with the 7-bit encoding scheme. However, the text message results in four concatenated SMS messages.

Figure 6C:
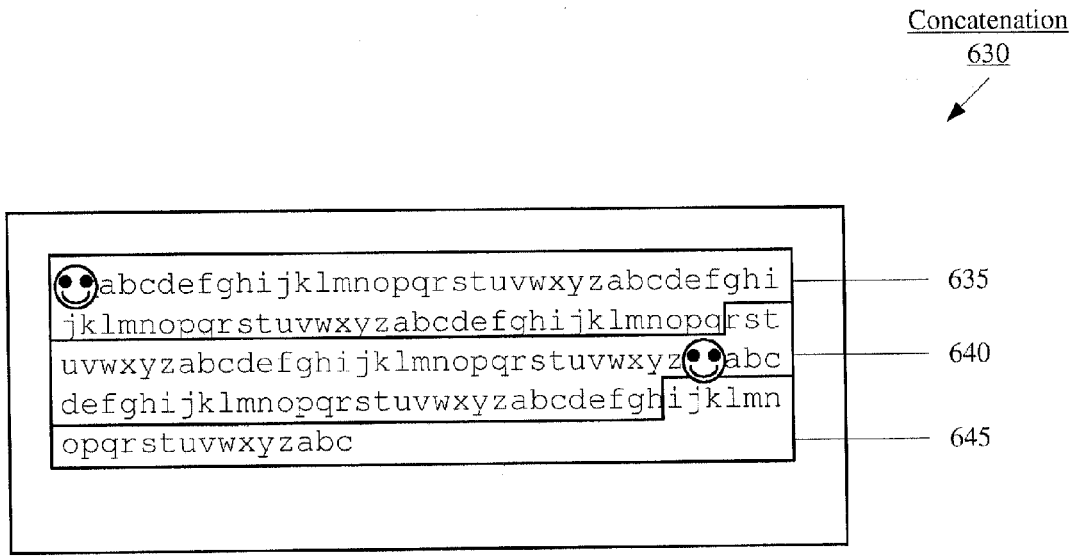

FIG. 6C shows a second concatenation 630 in which the text message 600 is separated into three concatenated SMS messages 635, 640, 645. The concatenation 630 may be generated by considering only a lowest number of concatenated SMS messages. Accordingly, the first concatenated SMS message 635 may include the Unicode character and 69 7-bit characters, all encoded with the 16-bit encoding scheme; the second concatenated SMS message 640 may include 35 7-bit characters, the Unicode character, and 34 7-bit characters, all encoded with the 16-bit encoding scheme (due to the mixture of characters); and the third concatenated SMS message 645 may include the remaining 21 7-bit characters, all encoded with the 7-bit encoding scheme. Thus, the concatenation 630 includes one less concatenated SMS message than the concatenation 605. Accordingly, the concatenation 630 may be selected by the concatenation application 240 over the concatenation 605.

Figure 6D:
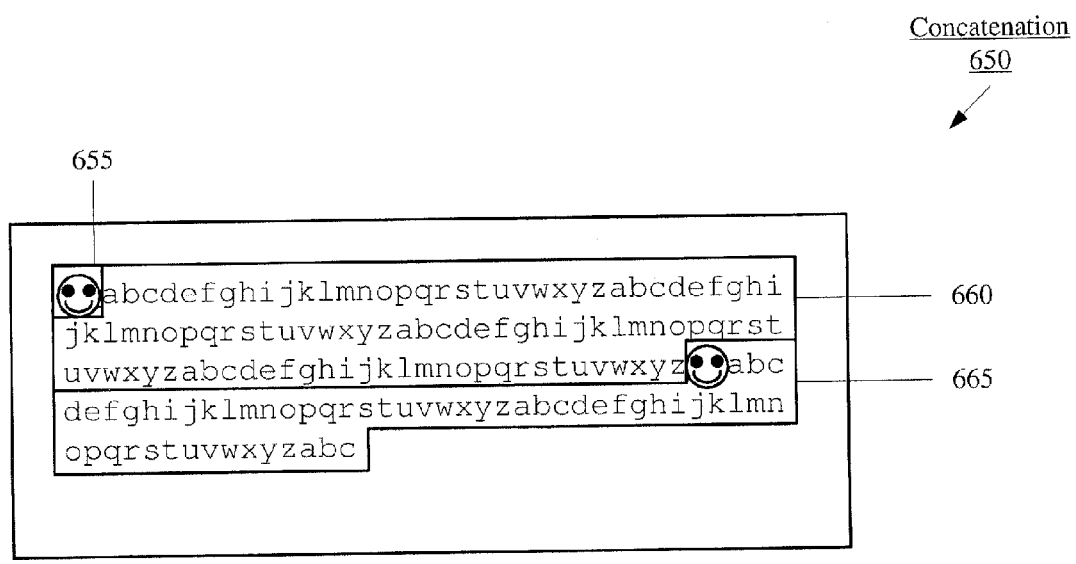

FIG. 6D shows a third concatenation 650 in which the text message 600 is also separated into three concatenated SMS messages 655, 660, 665. The concatenation 650 may be generated by considering both the lowest number of concatenated SMS messages and the lowest number of characters using a highest encoding scheme. Accordingly, the first concatenated SMS message 655 may include only the Unicode character encoded with the 16-bit encoding scheme; the second concatenated SMS message 660 may include 104 7-bit characters, all encoded with the 7-bit encoding scheme; and the third concatenated SMS message may include the Unicode character and 55 7-bit characters, all encoded with the 16-bit encoding scheme (due to the mixture of characters). This both minimizes the number of concatenated SMS messages as well as the number of characters using the highest encoding scheme. Therefore, the concatenation 650 may be selected by the concatenation application 240 over the concatenation 605 and the concatenation 630.

The exemplary embodiments provide a device and method of transmitting a text message using SMS and concatenation. The concatenation of the text message entails separating the text message into a plurality of portions. Specifically, each portion is a concatenated SMS message. A concatenation application is configured to determine a minimum number of concatenated SMS messages to be used to transmit the text message. The concatenation application is also configured to determine a respective encoding scheme to be used by each concatenated SMS message in order to achieve the minimum number of concatenated SMS messages. Specifically, each concatenated SMS message attempts to use a lowest encoding scheme prior to using a higher encoding scheme.

The exemplary embodiments may be configured to provide substantially similar features as the concatenation process provided in standard devices. Specifically, the stations may seamlessly provide the features of the exemplary embodiments. It should also be noted that if the transmitting station is configured with the concatenation application while the receiving station is only configured with a standard messaging application, the long text message may still be received as an entire message that is combined by the receiving station. Since the headers may provide the relevant information, a standard messaging application may still be configured to provide this combination feature of the concatenation process.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
   at a transmitting station:
   receiving a text message for transmission through a network to a receiving station, the text message including a plurality of characters;
   determining, based on a number of the plurality of characters and encoding schemes associated with the characters, that the text message is to be transmitted using concatenation;
   determining, based on the number of the plurality of characters and encoding schemes for each of the characters, a minimum number of concatenated messages used to transmit the text message;
   encoding each of the minimum number of concatenated messages for transmission, wherein a first of the concatenated messages is encoded by a first one of the encoding schemes and a second of the concatenated messages is encoded by a second one of the encoding schemes, wherein at least one of the characters in the second concatenated message cannot be encoded by the first encoding scheme; and
   transmitting the concatenated messages that have been respectively encoded to the receiving station.

2. The method of claim 1, wherein the text message is a Short Message Service (SMS) message and the encoding schemes are a 7-bit encoding scheme, an 8-bit encoding scheme, and a 16-bit encoding scheme.

3. The method of claim 2, wherein the use of the SMS is determined by configuration information of the transmitting station, configuration information of the receiving station, and network information of the network.

4. The method of claim 3, further comprising:
   receiving the configuration information of the receiving station by one of requesting the configuration information from the receiving station, transmitting a multimedia message service (MMS) message to the receiving station, and receiving the configuration information from the network.

5. The method of claim 2, wherein the 7-bit encoding scheme defines a first maximum number of characters for use in one of the concatenated messages as 160, the 8-bit encoding scheme defines a second maximum number of characters for use in one of the concatenated messages as 140, and the 16-bit encoding scheme defines a third maximum number of characters for use in one of the concatenated messages as 70.

6. The method of claim 5, wherein the use of the concatenation is determined when the number of the characters exceeds the first maximum number.

7. The method of claim 2, further comprising:
   determining, by the transmitting station, the encoding schemes to encode each of the concatenated messages by firstly selecting the 7-bit encoding scheme, secondly selecting the 8-bit encoding scheme, and thirdly selecting the 16-bit encoding scheme.

8. The method of claim 1, further comprising:
   receiving, by the receiving station, the concatenated messages that have been respectively encoded; and
   decoding, by the receiving station, each of the concatenated messages using the respective encoding scheme.

9. The method of claim 8, further comprising:
   combining, by the receiving station, the concatenated messages to generate the text message; and
   displaying, by the receiving station, the text message.

10. The method of claim 1, further comprising:
    generating, by the transmitting station, concatenation information to be pushed to a baseband layer to transmit the concatenated messages.

11. A station, comprising:
    a transceiver configured to establish a connection to a network; and
    a processor,
    wherein the processor and transceiver are configured to transmit a text message by:
    receiving a text message for transmission through a network to a receiving station, the text message including a plurality of characters;
    determining that the text message is to be transmitted using concatenation;
    determining a minimum number of concatenated messages used to transmit the text message;
    encoding each of the minimum number of concatenated messages for transmission, wherein a first of the concatenated messages is encoded by a first encoding scheme and a second of the concatenated messages is encoded by a second encoding scheme, wherein at least one of the characters in the second concatenated message cannot be encoded by the first encoding scheme; and
    transmitting the concatenated messages that have been respectively encoded to the receiving station.

12. The device of claim 11, wherein the encoding schemes include one of a 7-bit encoding scheme, an 8-bit encoding scheme, and a 16-bit encoding scheme.

13. The device of claim 11, wherein the text message is a Short Message Service (SMS) message and use of the SMS message is determined by configuration information of the transmitting station, configuration information of the receiving station, and network information of the network.

14. The device of claim 13, wherein the processor is configured to receive the configuration information of the receiving station by one of requesting the configuration information from the receiving station, transmitting a multimedia message service (MMS) message to the receiving station, and receiving the configuration information from the network.

15. The device of claim 12, wherein the 7-bit encoding scheme defines a first maximum number of characters for use in one of the concatenated messages as 60, the 8-bit encoding scheme defines a second maximum number of characters for use in one of the concatenated messages as 140, and the 16-bit encoding scheme defines a third maximum number of characters for use in one of the concatenated messages as 70.

16. The device of claim 15, wherein the use of the concatenation is determined when a number of the characters exceeds the first maximum number.

17. The device of claim 11, wherein the processor is configured to determine the encoding schemes by firstly selecting the first encoding scheme and secondly selecting the second encoding scheme.

18. The device of claim 11, wherein the concatenated messages are configured to be decoded by the receiving station using the respective encoding scheme.

19. The device of claim 18, wherein the concatenated messages are configured to be combined by the receiving station to generate the text message.

20. A non-transitory computer readable storage medium with an executable program stored thereon, wherein the program instructs a microprocessor to perform operations comprising:

receiving a text message for transmission through a network to a receiving station, the text message including a plurality of characters;

determining, based on a number of the plurality of characters and encoding schemes associated with the characters, that the text message is to be transmitted using concatenation;

determining, based on the number of the plurality of characters and encoding schemes for each of the characters, a minimum number of concatenated messages used to transmit the text message;

encoding each of the minimum number of concatenated messages for transmission, wherein a first of the concatenated messages is encoded by a first one of the encoding schemes and a second of the concatenated messages is encoded by a second one of the encoding schemes, wherein at least one of the characters in the second concatenated message cannot be encoded by the first encoding scheme; and transmitting the concatenated messages that have been respectively encoded to the receiving station.

\* \* \* \* \*